(12) United States Patent
Ebrahimi Afrouzi et al.

(10) Patent No.: US 10,223,793 B1
(45) Date of Patent: Mar. 5, 2019

(54) LASER DISTANCE MEASURING METHOD AND SYSTEM

(71) Applicants: Ali Ebrahimi Afrouzi, San Jose, CA (US); Soroush Mehrnia, Copenhagen (DK)

(72) Inventors: Ali Ebrahimi Afrouzi, San Jose, CA (US); Soroush Mehrnia, Copenhagen (DK)

(73) Assignee: AI Incorporated (CA)

( * ) Notice: Subject to any disclaimer, the term of this patent is extended or adjusted under 35 U.S.C. 154(b) by 137 days.

(21) Appl. No.: 15/224,442

(22) Filed: Jul. 29, 2016

Related U.S. Application Data

(60) Provisional application No. 62/201,313, filed on Aug. 5, 2015.

(51) Int. Cl.
*G06K 9/00* (2006.01)
*G06T 7/00* (2017.01)
*G06T 7/60* (2017.01)

(52) U.S. Cl.
CPC ............. *G06T 7/0073* (2013.01); *G06T 7/60* (2013.01); *G06T 2207/10028* (2013.01); *G06T 2207/10152* (2013.01)

(58) Field of Classification Search
CPC ..................... G06T 7/0073; G06T 7/60; G06T 2207/10028; G06T 2207/10152
See application file for complete search history.

(56) References Cited

U.S. PATENT DOCUMENTS

| | | | |
|---|---|---|---|
| 5,054,912 A | 10/1991 | Kuchel | |
| 6,545,749 B1 | 4/2003 | Andersson | |
| 6,847,435 B2 | 1/2005 | Honda et al. | |
| 7,187,452 B2 | 3/2007 | Jupp et al. | |
| 7,796,782 B1 | 9/2010 | Motamedi | |
| 7,889,324 B2 | 2/2011 | Yamamoto | |
| 7,995,799 B2 | 8/2011 | Schultz et al. | |
| 8,558,993 B2 | 10/2013 | Newbury et al. | |
| 2005/0212951 A1* | 9/2005 | Miyata | G02B 7/04 348/345 |
| 2005/0280802 A1 | 12/2005 | Liu | |
| 2011/0280272 A1* | 11/2011 | Yanagisawa | G02B 6/4209 372/98 |
| 2012/0185091 A1* | 7/2012 | Field | G05D 1/0044 700/254 |
| 2013/0301909 A1* | 11/2013 | Sato | G01B 11/25 382/154 |
| 2014/0128717 A1* | 5/2014 | Lytle | A61B 6/04 600/407 |

(Continued)

*Primary Examiner* — Amara Abdi
(74) *Attorney, Agent, or Firm* — STLG Law Firm; Soody Tronson

(57) ABSTRACT

A method for distance measurement is proposed in which two or more laser light emitters emitting converging collimated laser beams, an image sensor, and an image processor are positioned on a baseplate. The output of the laser light emitters from light points on surfaces substantially opposite the baseplate. The image sensor captures images of the projected light points. The area of the polygon or the length of the line resulting from connecting the light points is extracted by the image processor and compared to values in a preconfigured table relating polygon areas or line lengths to distances from the baseplate to surfaces.

14 Claims, 3 Drawing Sheets

(56) References Cited

U.S. PATENT DOCUMENTS

2015/0036886 A1* 2/2015 Matono .................. G08G 1/166
382/106
2016/0163057 A1* 6/2016 Rowley ................. G06T 7/0073
348/46

* cited by examiner

LASER DISTANCE MEASURING METHOD AND SYSTEM

CROSS-REFERENCE TO RELATED APPLICATIONS

This application claims the benefit of provisional patent application Ser. No. 62/201,313, filed Aug. 5, 2015 by the present inventors.

FIELD OF THE INVENTION

This disclosure relates to measurement systems, and more particularly to automatic distance measurement.

BACKGROUND OF INVENTION

Mobile robotic devices are being used more and more frequently in a variety of industries for executing different tasks with minimal or no human interactions. Such devices rely on various sensors to navigate through their environment and avoid driving into obstacles.

Infrared sensors, sonar and laser range finders are some of the sensors used in mobile robotic devices. Infrared sensors typically have a low resolution and are very sensitive to sunlight. Infrared sensors that use a binary output can determine whether an object is within a certain range, but are unable to accurately determine the distance to the object. Sonar systems rely on ultrasonic waves instead of light. Under optimal conditions, sonar systems can be very accurate, however, sonar systems have limited coverage areas; if used in an array, they can produce cross-talk and false readings; if they are installed too close to the ground, signals can bounce off the ground, degrading accuracy; and sound-absorbing materials in the area can produce erroneous readings.

Laser Distance Sensors (LDS) are very accurate distance measurement methods that can be used on robotic devices, but, due to their complexity and cost, these sensors are typically not a suitable option for robotic devices intended for day-to-day home use. These systems generally use two types of measurement methods: Time-of-Flight (ToF) and Triangulation. In ToF methods, the distance of an object is calculated based on the round trip of the emission and reception of a signal. In Triangulation methods, there is a source and a sensor on the device with a fixed baseline. The emitting source emits the laser beam at a certain angle. When the sensor receives the beam, the sensor calculates the degree at which the beam entered the sensor. Using those variables, the distance traveled by the laser beam may be calculated with triangulation.

A need exists for an improved method for measuring distance that is not susceptible to the above-mentioned restrictions.

SUMMARY

The present invention introduces a new method and system for distance measurement. This invention presents a distance measurement system comprising: laser light emitters disposed on a baseplate emitting at least two converging collimated laser beams that create a pattern of light points projected on surfaces; an image sensor disposed on the baseplate capturing images of the projected pattern; an image processor to determine an estimated distance from the baseplate to the surface on which the laser light beams are projected by comparing geometrical relations of the light points in the image with a preconfigured table that co-relates the geometrical relations of the light points at corresponding distances from the baseplate. This sensor assembly can be mounted on a rotating base to provide 360-degree coverage.

In some embodiments, two or more laser emitters are disposed on a baseplate such that the emission paths converge slightly, coinciding at a predetermined distance from the emitters. The distance at which the emissions coincide shall be at or before the effective range of the distance sensor. The laser emitters emit light points onto objects in front of the base. If two laser emitters are used, two light points are illuminated and the distance between them can be analyzed to figure the distance from the baseplate to the surface on which the lights points have been projected. If three laser emitters are used, three light points are illuminated, and the area of the triangle formed by connecting the three light points can be analyzed. If four laser emitters are used, the area of the quadrilateral formed by connecting the light points can be analyzed, and so on. As the number of laser emitters used is increased, the number of sides of the resulting polygon formed by connecting the light points increases. Any number of laser emitters may be used without departing from the invention.

An image sensor captures an image of the projected laser light emissions and processes the image. Using computer vision technology, the distances between light points are extracted and the area inside the polygon (or the length of the line, in cases with only two laser emitters) may be analyzed. Because the size of the polygon (or the length of the line) will decrease at a constant and measurable rate as the distance to the surface upon which it is projected is increased, this value (the area of the polygon, or the length of the line in cases with only two laser emitters) may be used to determine the distance to the surface on which the light is projected. False readings resulting from misshapen laser projections will be detected and discarded by the image processing unit to avoid reporting inaccurate distance readings.

DETAILED DESCRIPTION OF THE INVENTION

Figure 1:
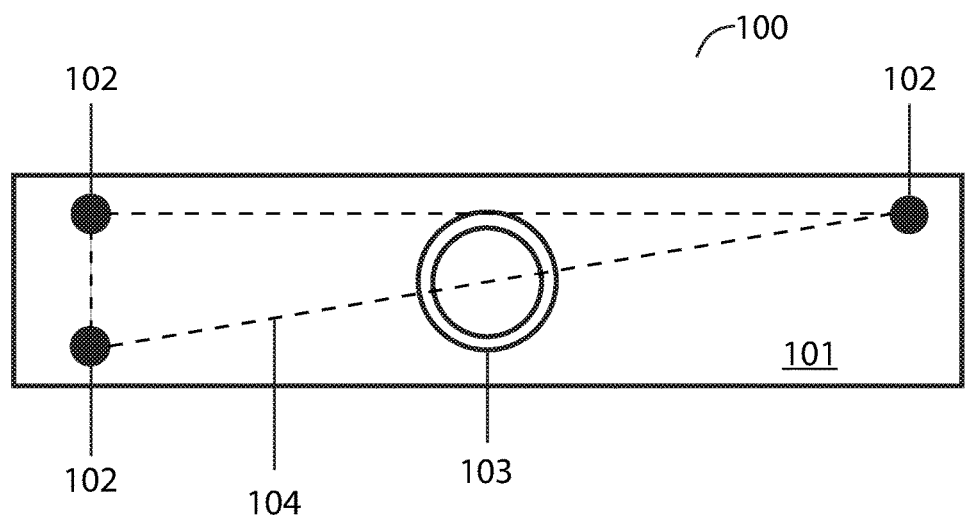
FIG. 1 illustrates a front elevation view of the distance measurement device embodying features of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention. The disclosure described herein is directed generally to one or more processor-automated methods and/or systems that measure distance of objects also known as distance measurement systems.

As understood herein, the term "image sensor" may be defined generally to include one or more sensors that detect and convey the information that constitutes an image by converting the variable attenuation of light waves into signals. The term "image processing unit" or "image processor" may be defined generally to include an image processing engine or media processor that uses signal processing to extract characteristics or parameters related to an input image.

This invention presents a system and method for measuring distance comprising emitting at least two converging collimated laser beams from laser light emitters disposed on a baseplate creating a pattern of light points projected on surfaces opposite the baseplate; capturing an image of the pattern as it is projected on the surface with an image sensor disposed on the baseplate; processing the image to extract geometrical relations of the pattern in the image; comparing geometrical relations of the pattern in the image with a preconfigured table of geometrical relations of the pattern at different distances from the light emitters by an image processor to determine an estimated distance of the baseplate from the surface.

The present invention combines computer vision and laser technology to calculate the distance to surrounding objects. An image sensor and at least two laser emitters that emit collimated laser beams are installed on a baseplate. In embodiments with only two laser emitters, the emitters are positioned on a planar line. In embodiments with three or more laser emitters, the emitters are positioned at the vertices of a geometrical shape (a triangle, in cases with three emitters, a quadrilateral in cases with four emitters, and so on). The laser emitters are positioned with a slight converging degree towards each other so the laser emissions coincide at a predetermined distance from the base. The laser emitters shall be positioned such that the emissions coincide at or before the maximum effective distance of the distance sensor, which is determined by the strength and type of laser emitters and the specifications of the image sensor used.

The laser emitters continuously project collimated laser beams, which appear as light points on objects or surfaces in front of the device. The image sensor captures an image of a predetermined area in front of the distance measurement system containing the projected light points. Captured images are sent to an image processor, which uses computer vision technology to extract the vertices of the polygon projected (or the endpoints of the line, in cases where only two laser emitters are used). The image processing unit then measures the distance between the vertices in the captured image and calculates the area of the projected polygon (or, in cases where only two laser emitters are used, determines the length of the projected line).

In the next step, the image processing unit compares the area size (or line length) to area sizes (or line lengths) in a pre-configured table that lists each valid area size (or line length) and a corresponding distance between the distance measurement device and the surface on which the image was captured, thereby identifying the distance to the surface upon which the laser light beams were projected. Separate tables will be consulted for embodiments with different numbers of laser emitters. For example, a table with data for devices with two laser emitters will only be used for devices with two laser emitters. Tables shall be constructed using actual data wherein area sizes (or line lengths) and corresponding distance measurements are recorded.

In some embodiments, the image processor determines the estimated distance to the surface upon which the emissions were projected using both the distance between light points and area of the projected polygon.

Referring to FIG. 1, a front elevation view of a distance measurement system is illustrated. In this embodiment, the distance measurement system 100 is comprised of a baseplate 101 on which are mounted laser emitters 102 and an image sensor 103. As mentioned previously, at least two laser emitters must be employed for the method to work. For illustrative purposes, an embodiment using three laser emitters is shown in this example. The laser emitters are positioned at the vertices of a polygon (or endpoints of a line, in cases of only two laser emitters). In this case, the laser emitters are positioned at the vertices of a triangle 104.

Figure 2:
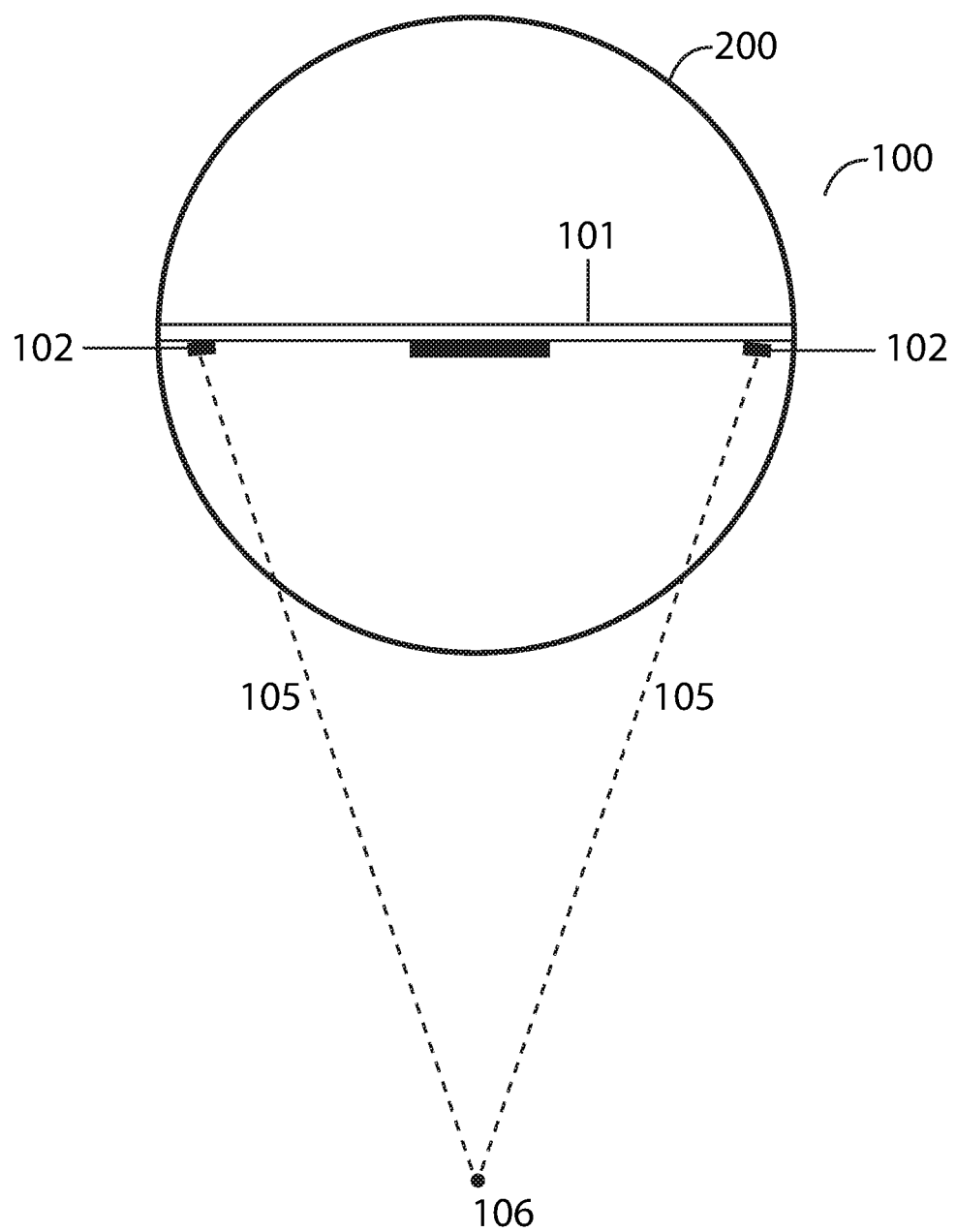
FIG. 2 illustrates an overhead view of the distance measurement device showing laser light emission patterns embodying features of the present invention.

Referring to FIG. 2, an overhead view of the top of the distance measurement system 100 is illustrated. As mentioned previously, the distance measurement system 100 may be positioned on a rotatable base 200 so that it may obtain distances in various directions. The laser emitters 102 are positioned on baseplate 101 and angled slightly inward toward each other so the collimated laser beams 105 coincide at one point 106 over a predetermined distance. The laser emitters should be angled so that the point 106 where the collimated laser beams coincide is at (or before) the maximum effective distance of the range finder device.

Because the laser light emitters are angled inward toward each other, the farther the laser travels from its source (and the baseplate), the smaller the area of the projected polygon (or the length of the line) will be until the collimated laser beams coincide and the inside area of the polygon (or the length of the line) becomes null.

Figure 3:
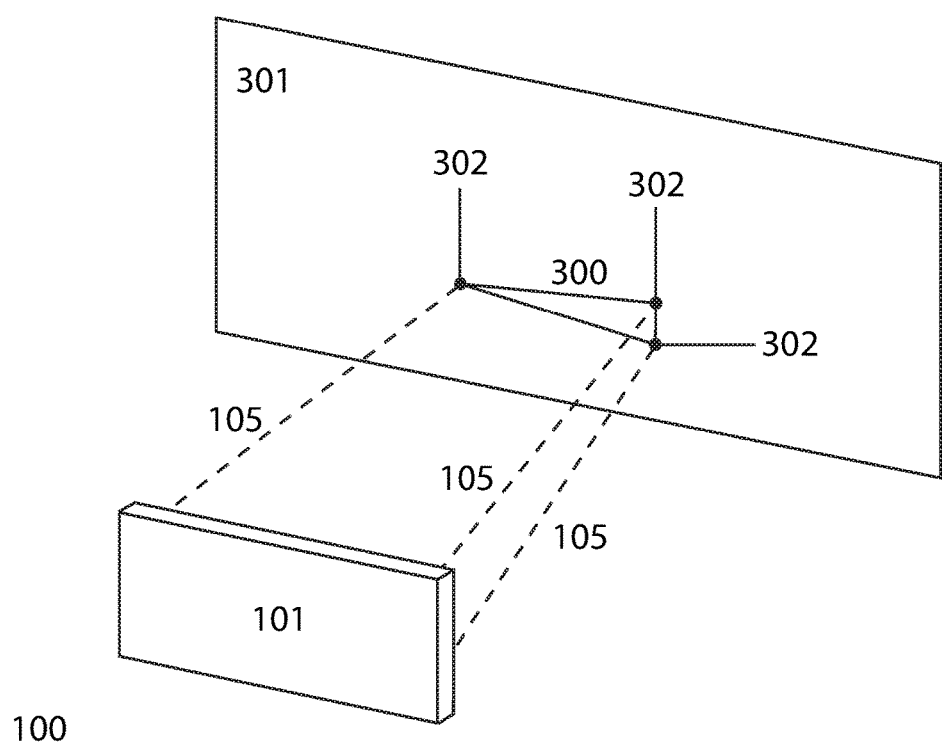
FIG. 3 illustrates a schematic view of the distance measurement device and resulting triangle formed by connecting the light points illuminated by three laser light emitters embodying features of the present invention.

Referring to FIG. 3, a perspective view of the distance measurement system 100 projecting collimated laser beams 105 onto a surface 301 is illustrated. The baseplate 101 and laser emitters (not shown) are facing a surface 301. The dotted lines 105 represent the laser beams. The beams are projected onto surface 301, creating the light points 302, which, if connected by lines, form triangle 300. The image sensor (not shown) captures an image of the projection and sends it to the image processing unit (not shown). The image processing unit extracts the triangle shape by connecting the vertices to form triangle 300 using computer vision technology, finds the lengths of the sides of the triangle; and uses those lengths to calculate the area within the triangle. The image processor then consults a pre-configured area-to-distance table with the calculated area to find the corresponding distance.

In the cases where misshapen polygons are detected due to faceted or light absorbing surfaces, readings shall be discarded to avoid exporting bad distance data. A set of predetermined parameters shall be defined to verify acceptable images. Such parameters may include any of: light points being within a predetermined vertical range of one another; light points being within a predetermined horizontal range of one another; at least a predetermined number of light points being detected; and a vertex angle being within a predetermine range of degrees.

We claim:

1. A method for measuring distance, the method comprising:
   emitting at least two converging collimated laser beams from laser light emitters disposed in a predetermined pattern on a baseplate directly onto surfaces opposite the baseplate that form a pattern of separate light points thereon;
   iteratively capturing images of the pattern of separate light points projected on surfaces with an image sensor disposed on the baseplate;
   processing the images to extract geometrical relations of the pattern of separate light points in the images;
   comparing geometrical relations of the pattern of separate light points in the images with a preconfigured table of geometrical relations of the pattern of light points at different distances from the laser light emitters by an image processor to determine estimated distances from the baseplate to the surfaces.

2. The method of claim 1 wherein comparing geometrical relations of the pattern of separate light points in the images with the preconfigured table of geometrical relations of the pattern of light points at different distances comprises:
   comparing a distance between two projected laser light points in the image to a preconfigured table of distances that co-relates distances between the two points in the pattern with distances from the baseplate to surfaces on which the light points were projected.

3. The method of claim 1 wherein comparing geometrical relations of the pattern of separate light points in the images with the preconfigured table of geometrical relations of the pattern of light points at different distances comprises: comparing an area between three or more projected laser light points in the image to a preconfigured table of areas that co-relates areas between the three or more points in the pattern with distances from the baseplate to surfaces on which the light points were projected.

4. The method of claim 1 wherein the baseplate is installed on a rotatable base member such that the baseplate may be angled in any direction within a plane.

5. The method of claim 1 wherein the converging collimated laser beams are angled such that they converge at a single point no further than a maximum effective distance of the image sensor and the laser emitters.

6. The method of claim 1 wherein the preconfigured table is constructed from actual measurements of the geometrical relations of the laser light points as they are projected on surfaces at intervals of a predetermined range of distances from the baseplate.

7. The method of claim 2 wherein the preconfigured table is constructed from actual measurements of the distance between the two light points as they are projected surfaces at intervals of a predetermined range of distances from the baseplate and the corresponding distance from the baseplate to surfaces upon which the light points are projected.

8. The method of claim 3 wherein the preconfigured table is constructed from actual measurements of the area within the light points as they are projected on surfaces at intervals of a predetermined range of distances from the baseplate and the corresponding distance from the baseplate to surfaces upon which the light points are projected.

9. The method of claim 1 wherein multiple geometrical relations of the light points are compared with preconfigured tables of geometrical relations of the pattern of light points at different distances from the light emitters to determine estimated distances of the baseplate from surfaces.

10. The method of claim 1 wherein image data is discarded if the pattern in the image does not meet any of a predetermined set of criteria, including any of:
    light points being within a predetermined vertical range of one another;
    light points being within a predetermined horizontal range of one another;
    at least a predetermined number of light points being detected; and
    a vertex angle being within a predetermine range of degrees.

11. A computing device program product for utilizing a range finding device comprising:
    a non-transitory computer readable medium;
    first programmatic instructions for laser light emitters disposed on a baseplate to directly emit at least two collimated laser beams on a surface in a pattern of separate light points;
    second programmatic instructions for an image sensor disposed on the baseplate to capture an image of the pattern of separate light points made by the at least two collimated laser beams on the surface;
    third programmatic instructions for an image processor to measure a set of predetermined geometrical relations of the pattern of separate light points in the image; and
    fourth programmatic instructions for the image processor to compare the geometrical relations of the pattern of separate light points in the image with figures in a preconfigured table co-relating the geometrical relations of the pattern of separate light points with corresponding distances from the baseplate to surfaces to estimate the distance from the baseplate to the surface in the image.

12. The program product of claim 11, wherein the geometrical relations of light points that are compared are any of: the distance between two projected laser light points, and, the area within the projected laser light points.

13. A distance measurement system for robotic devices comprising:
    at least two laser light emitters disposed in a pattern of separate light points on a baseplate emitting converging collimated laser beams on surfaces opposite the baseplate, forming light points thereon;
    an image sensor disposed on the baseplate capturing an image of the pattern of separate light points;
    an image processor to determine an estimated distance from the baseplate to the surface on which the laser light beams are projected by comparing a set of predetermined geometrical relations of the pattern of separate light points in the image with a preconfigured table that co-relates the geometrical relations of the pattern of separate light points at corresponding distances from the baseplate.

14. The system of claim 13 wherein the geometrical relations of light points that are compared are any of: a distance between two projected laser light points, and, an area within the projected laser light points.

* * * * *